US007317982B2

(12) United States Patent
Tsukasaki et al.

(10) Patent No.: US 7,317,982 B2
(45) Date of Patent: Jan. 8, 2008

(54) ESTIMATING DEVICE AND VEHICLE MOTION CONTROL DEVICE USING THE SAME

(75) Inventors: Yuichiro Tsukasaki, Tokyo (JP); Masaru Kogure, Tokyo (JP)

(73) Assignee: Fuji Jukogyo Kabishiki Kaisha, Tokyo (JP)

( * ) Notice: Subject to any disclaimer, the term of this patent is extended or adjusted under 35 U.S.C. 154(b) by 317 days.

(21) Appl. No.: 11/135,433

(22) Filed: May 24, 2005

(65) Prior Publication Data

US 2005/0273241 A1 Dec. 8, 2005

(30) Foreign Application Priority Data

Jun. 4, 2004 (JP) ............................. 2004-166867

(51) Int. Cl.
G06F 19/00 (2006.01)
G06F 7/60 (2006.01)
G06F 7/70 (2006.01)

(52) U.S. Cl. ........................................ 701/70; 701/124
(58) Field of Classification Search .................... None
See application file for complete search history.

(56) References Cited

U.S. PATENT DOCUMENTS

| 5,136,513 | A | * | 8/1992 | Sol et al. ..................... 701/124 |
| 5,500,798 | A | * | 3/1996 | Inagaki ........................ 701/37 |
| 5,610,372 | A | * | 3/1997 | Phillips et al. ............ 177/25.14 |
| 6,138,505 | A | * | 10/2000 | Miyazaki ...................... 73/146 |
| 6,314,383 | B1 | * | 11/2001 | Leimbach et al. .......... 702/173 |
| 6,347,269 | B1 | * | 2/2002 | Hayakawa et al. ........... 701/51 |
| 6,438,510 | B2 | * | 8/2002 | Zhu et al. .................... 702/175 |
| 6,526,334 | B1 | * | 2/2003 | Latarnik et al. ............... 701/1 |
| 6,904,351 | B1 | * | 6/2005 | Hac ............................. 701/70 |
| 6,984,003 | B2 | * | 1/2006 | Kogure et al. .............. 303/146 |
| 2003/0040861 | A1 | * | 2/2003 | Bellinger et al. ............. 701/51 |
| 2004/0167705 | A1 | * | 8/2004 | Lingman et al. ............ 701/124 |

(Continued)

FOREIGN PATENT DOCUMENTS

DE 4228413 A1 * 3/1994

(Continued)

OTHER PUBLICATIONS

U.S. Appl. No. 11/177,286, filed Jul. 11, 2005, entitled Wheel Ground-Contact State Judging Device and Method and Vehicle Motion Control Device.

*Primary Examiner*—Michael J. Zanelli
(74) *Attorney, Agent, or Firm*—Smith, Gambrell & Russell LLP

(57) ABSTRACT

A detector 22 detects action forces acting on a wheel 5 provided to a vehicle. An estimator 21a estimates the present value of a vehicle mass m on the basis of an action force acting in a component force direction out of the action forces, and an acceleration of the vehicle in the component force direction. Specifically, the estimator 21a estimates the present value of the vehicle mass m on the basis of an acceleration ax in the longitudinal direction and a longitudinal force Fx or on the basis of an acceleration ay in the lateral direction and a lateral force Fy. The estimator estimates the present value of a center-of-gravity height of the vehicle on the basis of the detected variation amount of the vertical force and the detected longitudinal force.

14 Claims, 4 Drawing Sheets

U.S. PATENT DOCUMENTS

2005/0065695 A1 * 3/2005 Grieser .................. 701/70

FOREIGN PATENT DOCUMENTS

| | | |
|---|---|---|
| JP | 4-331336 | 11/1992 |
| JP | 8-002274 | 1/1996 |
| JP | 10-318862 | 12/1998 |
| JP | 2002-022579 | 1/2002 |
| JP | 2002-39744 | 2/2002 |
| JP | 2002-293226 | 10/2002 |

* cited by examiner

ESTIMATING DEVICE AND VEHICLE MOTION CONTROL DEVICE USING THE SAME

CROSS REFERENCE TO RELATED APPLICATIONS

The disclosure of Japanese Application NO. 2004-166867 filed on Jun. 4, 2004 including the specification, drawing and abstract is incorporated herein by reference in its entirety.

BACKGROUND OF THE INVENTION

1. Field of the Invention

The present invention relates to an estimating device and a vehicle motion control device using the same, and particularly to a method of estimating various kinds of values concerning a vehicle.

2. Description of the Related Art

There has been known a controller for controlling the motion state of a vehicle for the purpose of enhancing the driving stability of the vehicle. For example, JP-A-2002-293226 discloses a controller for selectively applying a braking force to proper wheels on the basis of the forces applied to the vehicle during cornering and a controller for controlling the steering angle of the rear wheels in accordance with the travel state of the vehicle. The forces applied to the vehicle during cornering or the travel state of the vehicle can be estimated on the basis of various kinds of predetermined values concerning the vehicle, specifications, etc.

However, the predetermined data, etc. may be different from the actual values because of the number of occupants or the presence or absence of a load. In order to enhance the reliability of the control, it is important to correspond various kinds of values concerning the vehicle with the actual values.

SUMMARY OF THE INVENTION

An object of the present invention is to estimate various kinds of values concerning a vehicle with high precision by real-time processing.

Furthermore, another object of the present invention is to enhance the reliability of vehicle motion control on the basis of the estimating calculation of the various kinds of values concerned the vehicle.

In order to attain the above object, according to a first aspect of the present invention, there is provided an estimating device comprising a first detector for detecting action forces acting on a wheel provided to a vehicle, and an estimator for estimating a present value of a vehicle mass on the basis of a component force direction of the action forces which acts in some component-force direction and an acceleration of the vehicle in the component force direction.

Here, in the first aspect of the present invention, the estimating device further comprises one of an acceleration in the longitudinal (front-and-rear) direction of the vehicle and an acceleration in the lateral direction of the vehicle, and one of the first detector may detect a longitudinal force and the lateral force as the action force corresponding to the direction of the detected acceleration. In this case, it is preferable that the estimator estimates the present value of the vehicle mass on the basis of the detected acceleration in the longitudinal direction and the detected longitudinal force or on the basis of the detected acceleration in the lateral direction and the detected lateral force.

Furthermore, in the first aspect of the present invention, the first detector may detect as the action force the variation amount of the vertical (up-and-down) force to a reference value and the longitudinal force. In this case, it is preferable that the estimator estimates the present value of the center-of-gravity height of the vehicle on the basis of the detected variation amount of the vertical force and the detected longitudinal force.

Still furthermore, in the first detector according to the first aspect of the invention, it is preferable that the lateral force is detected as the action force. In this case, it is preferable that the estimator estimates the present value of the distance between the center-of-gravity of the vehicle and the axle of the vehicle on the basis of the detected variation amount of the vertical force and the detected lateral force.

In the first aspect of the present invention, it is preferable that the estimator estimates the absolute value of the vertical force on the basis of the estimated present value of the vehicle mass, the estimated present value of the center-of-gravity height, the estimated present value of the distance between the center-of-gravity and the axle of the vehicle, the detected longitudinal force and the detected lateral force.

Furthermore, according to a second aspect of the present invention, there is provided an estimating device comprising a first detector for detecting a variation amount of vertical force and longitudinal force based on some value as action force acting on the wheels provided to a vehicle, and an estimator for estimating the present value of the center-of-gravity height of the vehicle on the basis of the detected variation amount of the vertical force and the detected longitudinal force.

Still furthermore, according to a third aspect of the present invention, there is provided a vehicle motion control device comprising the estimating device according to the first or second aspect of the present invention, and a controller for controlling the motion state of the vehicle on the basis of the estimation result achieved by the estimating device.

According to the present invention, even in such a situation that the number of occupants is changed or a load is mounted, the various kinds of values concerning the vehicle which should be changed in connection with the change of the situation can be estimated on a real-time basis.

Furthermore, the action force is directly detected by the detector, and thus the value thereof can be surely specified. Therefore, by estimating the various kinds of values on the basis of the action force, the estimation precision can be enhanced.

According to the present invention, the reliability of the vehicle motion control can be enhanced by applying the above estimation result to the vehicle control.

DETAILED DESCRIPTION OF THE PREFERRED EMBODIMENT

A preferred embodiment according to the present invention will be described hereunder with reference to the accompanying drawings.

Figure 1:
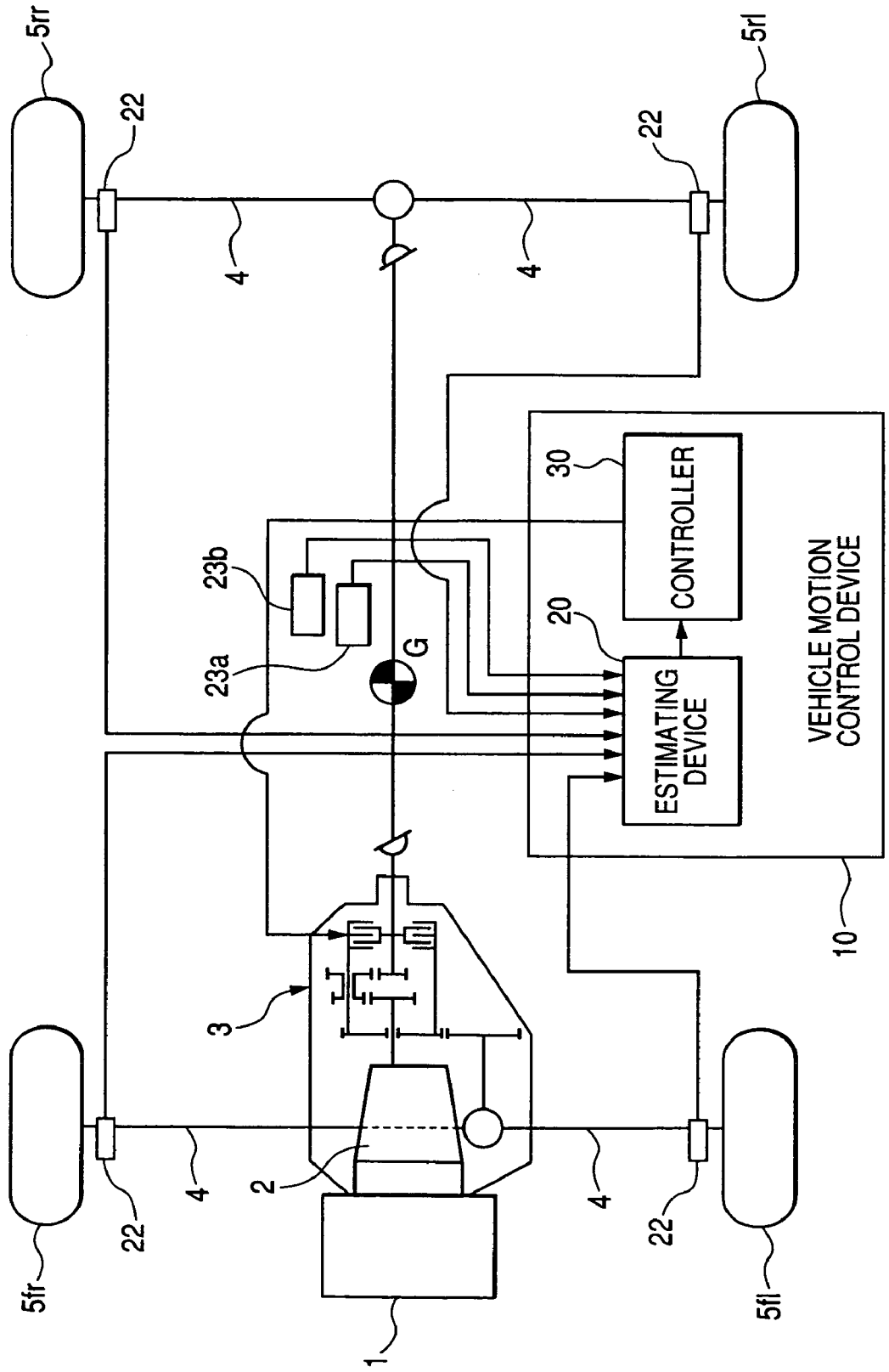
FIG. 1 is a schematic diagram showing a vehicle to which a vehicle motion control device according to an embodiment is applied.

FIG. 1 is a diagram showing a vehicle to which a vehicle motion control device according to an embodiment is applied. The vehicle is a four-wheel drive car which is driven by the front and rear wheels(four wheels). The driving force from the crank shaft (not shown) of an engine 1 is transmitted through an automatic transmission 2 to a center differential device 3. Furthermore, the driving force transmitted to the center differential device 3 is transmitted to each of the driving shafts (axles) 4 of the front-wheel and rear-wheel sides. When the driving force is transmitted to each axle 4, rotational torque is applied to the left and right front wheels 5fl, 5fr and the left and right rear wheels 5rl, 5rr, so that the driving force occurs in the four wheels 5fl to 5rr. In this specification, the term "wheel 5" is used when the wheels 5fl to 5rr are generally indicated or when a specific wheel is not indicated although it is a single wheel.

The vehicle motion control device 10 for controlling the motion state of the vehicle mainly comprises an estimating device 20 and a controller 30. The estimating device 20 is a device for estimating the present values of various kinds of values concerning the vehicle, and the specific construction thereof will be described later. The values to be estimated by the estimating device 20 are a vehicle mass m, the center-of-gravity height h of the vehicle (hereinafter referred to as "center-of-gravity height"), the distance 1 between the axle 4 and the center-of-gravity G and the absolute value of vertical force Fz acting on the wheel 5 (it is equal to zero under non-load state). The controller 30 controls various kinds of actuators on the basis of the estimation result achieved by the estimating device 20. A microcomputer mainly comprising CPU, ROM, RAM and an input/output interface is used as the controller 30.

Figure 2:
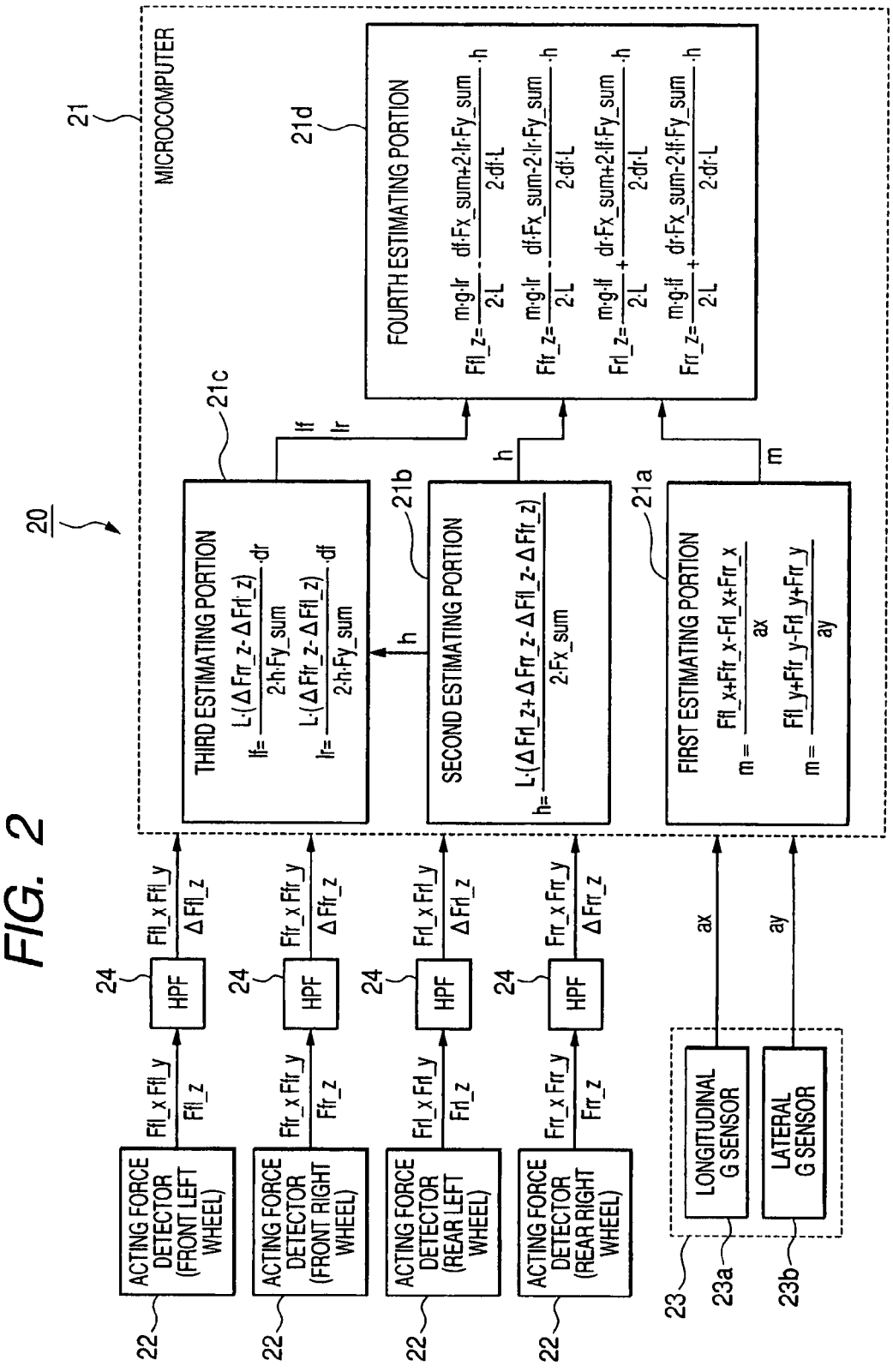
FIG. 2 is a block diagram showing an estimating device.

FIG. 2 is a block diagram showing the estimating device 20. The estimating device 20 is mainly constructed by a microcomputer 21 comprising CPU, ROM, RAM, the input/output interface, etc. The microcomputer 21 carries out the operations concerning the estimation of the present values of the various kinds of values according to a control program stored in ROM. Detection signals are input from an action force detector 22 and an acceleration detector 23 to the microcomputer 21 to estimate the various kinds of values.

Figure 3:
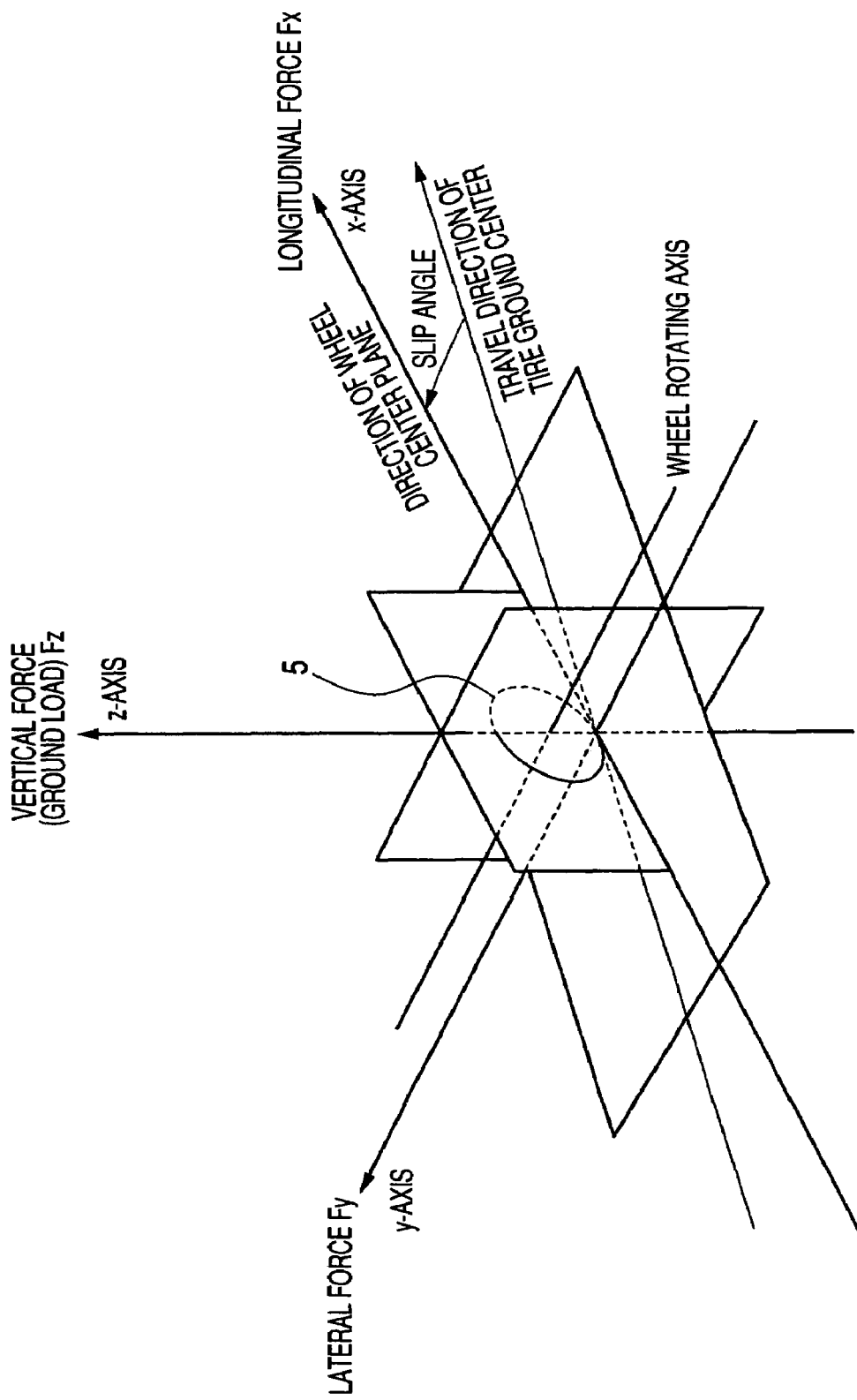
FIG. 3 is a diagram showing action force acting on wheels.

FIG. 3 is a diagram showing the action force acting on the wheel 5, in this embodiment, the action force means a tire force applied to the wheel 5. The action force detector 22 is installed on the axle 4 of each wheel 5, and detects the action force acting on each wheel 5. The action force detector 22 is detected as components of force acting on the wheel 5 in three directions, specifically, the longitudinal force Fx, the lateral force Fy and the vertical force Fz as individual action forces. The longitudinal force Fx is a component force occurring in the direction (x-axis) parallel to the wheel center plane out of the friction force occurring at the ground plane of the wheel 5, and the lateral force Fy is a component force occurring in the direction (y-axis) vertical to the wheel center plane. The vertical force Fz is a force acting in the vertical direction (z-axis), so-called a vertical load.

The action force detector 22 is mainly constructed by a strain gauge and a signal processing circuit for processing an electrical signal output from the strain gauge and generating the detection signal corresponding to the action force. On the basis of the knowledge that the stress occurring in the axle 4 is proportional to the action force, the strain gauge is embedded in the axle 4, and the action force detector 22 directly detects the action force. The specific construction of the action force detector 22 is disclosed in JP-A-04-331336 and JP-A-10-318862, for example, and it may be referred to.

For suppressing the influence of the temperature drift, the detection signal from the action force detector 22 is subjected to filtering process by a high pass filter 24, and then input to the microcomputer 21. The temperature drift is the phenomenon that the detection value of the action force detector 22 is offset from the value to be originally detected, and it occurs when the axle 4 is heated due to the temperature increase of tires and heating of brake pads during travel of the vehicle. The low-frequency components are removed from the detection signal by the filtering process, and the detection signal input to the microcomputer 21 corresponds to the variation amount of the action force with respect to the value under the stationary state of the vehicle. The longitudinal force Fx and the lateral force Fy correspond to the variation amounts of the force with respect to the value under the stationary state of the vehicle, and thus the detection value is not varied even when the filtering process is carried out. On the other hand, the vertical force Fz corresponds to the variation amount of force based on the empty weight of the vehicle under the stationary state of the vehicle, and thus the value is relativized by carrying out the filtering process. In other words, the action force detector 22 detects as the action force the variation amount $\Delta fz$ (Fz−Fz0) of the vertical force Fz to a reference value (in this embodiment, the reference value is the vertical force fz0 under the stationary state), In this specification, this variation amount $\Delta Fz$ will be merely referred to as "vertical force $\Delta Fz$", and the vertical force Fz in which the variation amount under non-load state is equal to zero will be referred to as "the absolute value Fz of the vertical force".

The acceleration detector 23 comprises a longitudinal G sensor 23a for detecting an acceleration ax in the longitudinal direction of the vehicle (hereinafter referred to as "longitudinal acceleration"), and a lateral G sensor 23b for detecting an acceleration ay in the lateral direction of the vehicle (hereinafter referred to as "lateral acceleration"). A well-known acceleration sensor may be used as each of the G sensors 23a, 23b. The method of detecting the acceleration is not limited to the manner using the G sensors 23a, 23b installed in the vehicle. For example, the acceleration detector 23 may detect the vehicle speed of the vehicle and specify the variation amount of the vehicle speed per unit time as a longitudinal acceleration ax. Furthermore, from the viewpoint that an error component caused by a roll motion is easily contained in the lateral G sensor 23b, the lateral acceleration ay which actually occurs in the vehicle may be specified on the basis of the detection value of the lateral G sensor 23b and the predetermined roll characteristic of the vehicle.

When viewing the microcomputer 21 functionally, it has first to fourth estimators 21a to 21d. The first estimator 21a calculates the present value of the vehicle mass m on the basis of the longitudinal force Fx and the longitudinal acceleration ax or on the basis of the lateral force Fy and the lateral acceleration ay. The second estimator 21b calculates the present value of the center-of-gravity height h on the basis of the vertical force $\Delta Fz$ and the longitudinal force Fx. The third estimator 21c estimates the present value of the distance 1 on the basis of the present value of the center-of-gravity height h, the vertical force $\Delta Fz$ and the lateral force Fy. The fourth estimator 21d estimates the present value of the absolute value Fz of the vertical force on the basis of the present value of the vehicle mass m, the present value of the center-of-gravity height h, the present value of the distance l, the longitudinal force Fx and the lateral force Fy.

Figure 4:
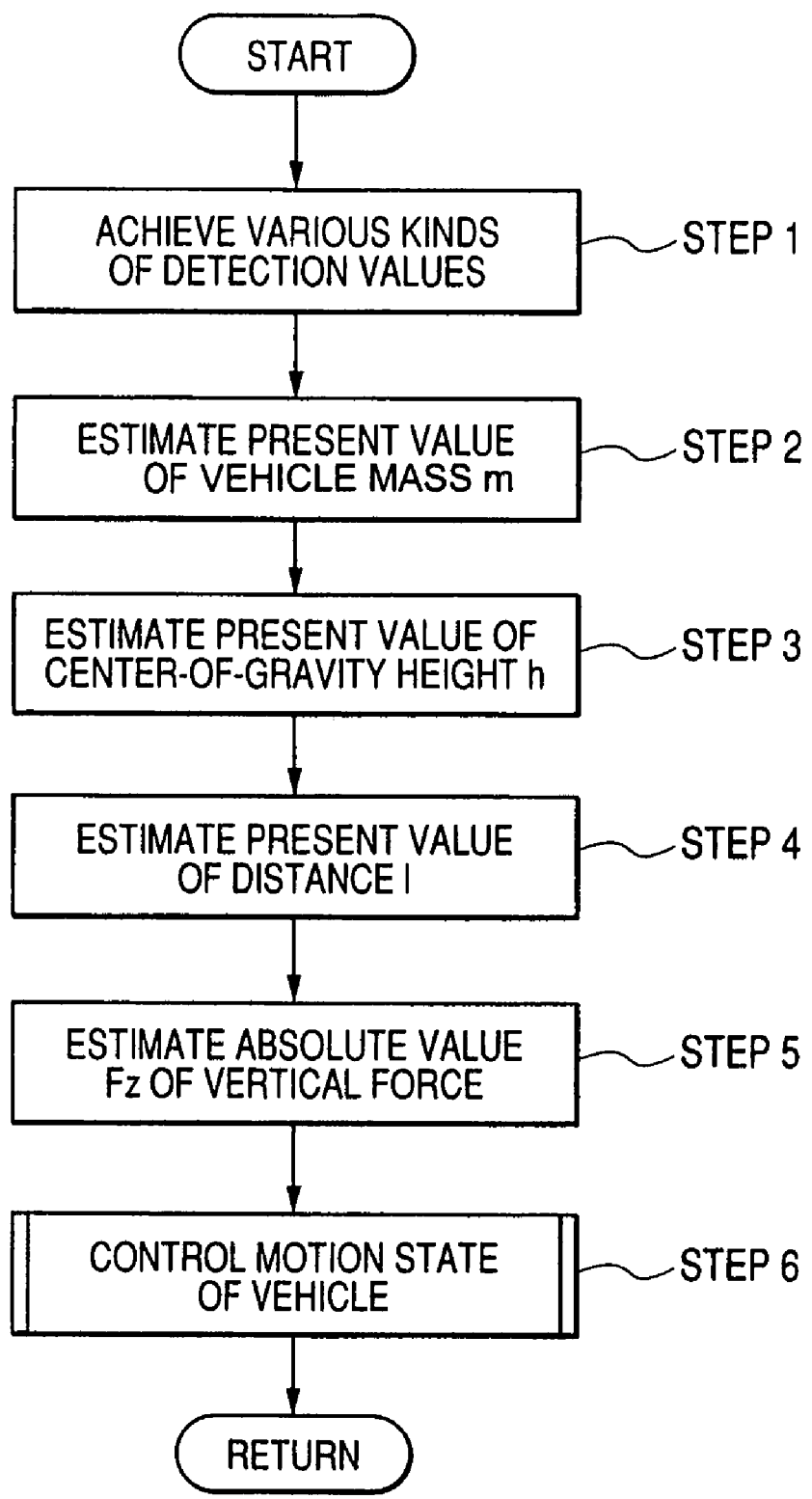
FIG. 4 is a flowchart showing a vehicle motion control routine according to the embodiment.

FIG. 4 is a flowchart showing a vehicle motion control routine according to this embodiment. This routine is executed by the microcomputer at a predetermined interval. First, the action forces Fx, Fy, ΔFz of each wheel 5, the longitudinal acceleration ax and the lateral acceleration ay are obtained in step 1.

In step 2, the present value of the vehicle mass m is estimated. The vehicle mass m is estimated on the basis of the following equation (1) or (2). In the following equations, F represents the action force, and the wheels 5*fl*, 5*fr*, 5*rl*, 5*rr* on which the action force acts are discriminated from one another by subscripts fl, fr, rl, rr attached to the alphabet F. Furthermore, the component force directions in which the action force acts are discriminated from one another by the subscripts x, y, z subsequent to underlines (the same is applied to the equations described later). For example, Ffl_x represents the action force acting in the x-axis direction of the left front wheel 5*fl*, that is, it represents the longitudinal force Fx of the left front wheel 5*fl*.

$$m = \frac{\text{Ffl\_x} + \text{Ffr\_x} + \text{Frl\_x} + \text{Frr\_x}}{a_x} \quad (1)$$

$$m = \frac{\text{Ffl\_y} + \text{Ffr\_y} + \text{Frl\_y} + \text{Frr\_y}}{a_y} \quad (2)$$

[Equation 1]

According to the equation (1), the vehicle mass m is a value calculated by dividing the sum of the longitudinal forces Fx of each wheel 5 by the longitudinal acceleration ax. According to the equation (2), the vehicle mass m is a value calculated by dividing the sum of the lateral forces Fy of each wheel 5 by the lateral acceleration ay. The vehicle mass m may be calculated by using one of the equations (1) and (2), and it is preferable that one of the equations is selectively used in accordance with the travel condition of the vehicle. For example, when the vehicle is being accelerated, that is, when the detection value is being calculated from the longitudinal G sensor 23*a*, the equation (1) is used. When the vehicle is making a turning motion, that is, when the detection value is calculated from the lateral G sensor 23*b*, the equation (2) is used.

In step 3, the present value of the center-of-gravity height h is estimated. The center-of-gravity height h is estimated on the basis of the following equation.

$$h = \frac{L \cdot (\Delta \text{Frl\_z} + \Delta \text{Frr\_z} - \Delta \text{Ffl\_z} - \Delta \text{Ffr\_z})}{2 \cdot \text{Fx\_sum}}$$

[Equation 2]

In the above equation, Fx_sum represents the sum of the longitudinal forces Fx of each wheel 5, and L represents the wheel base. The center-of-gravity height h is calculated by dividing the difference between the sum of the vertical forces ΔFrl_z and ΔFrr_z of the right and left rear wheels 5*rl* and 5*rr* and the sum of the vertical forces ΔFfl_z and ΔFfr_z of the right and left front wheels 5*fl* and 5*fr* by the sum Fx_sum of the longitudinal forces Fx and then multiplying the division result by the proportionality constant (L/2) corresponding to the vehicle.

In step 4, the present value of the distance l between the center-of-gravity G and the axle 5 is estimated. The distance l is estimated on the basis of the following equations.

$$lf = \frac{L \cdot (\Delta \text{Frr\_z} - \Delta \text{Frl\_z})}{2 \cdot h \cdot \text{Fy\_sum}} \cdot dr$$

$$lr = \frac{L \cdot (\Delta \text{Ffr\_z} - \Delta \text{Ffl\_z})}{2 \cdot h \cdot \text{Fy\_sum}} \cdot df$$

[Equation 3]

lf represents the distance between the axle 4 and the center-of-gravity G of the front wheel side (hereinafter referred to as "front wheel distance"), and lr represents the distance between the axle 4 and the center-of-gravity G of the rear wheel side (hereinafter referred to as "rear wheel distance"). In the above equations, Fy_sum represents the sum of the lateral forces Fy of the respective wheels 5, df represents a front wheel tread, and dr represents a rear wheel tread. The front wheel distance if is calculated by dividing the difference between the vertical forces ΔFrl_z and ΔFrr_z of the left and right rear wheels 5*rl* and 5*rr* by the product of the sum Fy_sum of the lateral force Fy and the center-of-gravity height h and then multiplying the division result by the proportionality constant (L·dr/2) corresponding to the vehicle. Furthermore, the rear wheel distance lr is calculated by dividing the difference between the vertical forces ΔFfl_z and ΔFfr_z of the left and right rear wheels 5*fl* and 5*fr* by the product of the sum Fy_sum of the lateral force Fy and the center-of-gravity height h and then multiplying the division result by the proportionality constant (L·df/2) corresponding to the vehicle. In step S4, it is unnecessary to calculate each of the front wheel distance if and the rear wheel distance lr on the basis of the above equations. This is because if one distance l is estimated on the basis of the equation (1) or (2), the other distance l is estimated by subtracting the one distance l from the wheel base L.

In step 5, the present values of the absolute values Fz of the vertical forces are estimated. The absolute values Fz of the vertical forces are uniquely calculated on the basis of the following equations.

$$\text{Ffl\_z} = \frac{m \cdot g \cdot lr}{2 \cdot L} - \frac{df \cdot \text{Fx\_sum} + 2 \cdot lr \cdot \text{Fy\_sum}}{2 \cdot df \cdot L} \cdot h$$

$$\text{Ffr\_z} = \frac{m \cdot g \cdot lr}{2 \cdot L} - \frac{df \cdot \text{Fx\_sum} - 2 \cdot lr \cdot \text{Fy\_sum}}{2 \cdot df \cdot L} \cdot h$$

$$\text{Frl\_z} = \frac{m \cdot g \cdot lf}{2 \cdot L} + \frac{dr \cdot \text{Fx\_sum} - 2 \cdot lf \cdot \text{Fy\_sum}}{2 \cdot dr \cdot L} \cdot h$$

$$\text{Frr\_z} = \frac{m \cdot g \cdot lf}{2 \cdot L} + \frac{dr \cdot \text{Fx\_sum} + 2 \cdot lf \cdot \text{Fy\_sum}}{2 \cdot dr \cdot L} \cdot h$$

[Equation 4]

In the above equations, g represents the acceleration of gravity, and the absolute values Ffl_z, Ffr_z of the vertical forces concerning the front wheels 5*fl*, 5*fr* are calculated on the basis of the vehicle mass m, the center-of-gravity height h, the rear wheel distance lr, the longitudinal force Fx (sum Fx_sum) and the lateral Fy (sum Fy_sum). The absolute values Frl_z, Frr_z of the vertical forces concerning the rear wheels 5*rl*, 5*rr* are calculated on the basis of the vehicle mass m, the center-of-gravity height h, the front wheel distance lf, the longitudinal force Fx (sum Fx_sum) and the lateral force Fy (sum Fy_sum).

In step 6, the motion state of the vehicle is controlled on the basis of the estimation results of the steps 2 to 5. The vehicle control may be carried out by independently using specific values out of the various kinds of estimated values or by combining plural values. A method using a stability factor may be used as an example of the vehicle control. The stability factor is an estimation value indicating a steer characteristic, and it is a target for the behavior (that is, stability) of the vehicle during the cornering state. When this value is positive, the vehicle falls into an under-steer tendency state, and when this value is negative, the vehicle falls into an over-steer tendency state. The optimal value of the stability factor is varied in accordance with the vehicle, and it is set at the design stage or the like. By carrying out the vehicle control so that the stability factor of the vehicle under travel is the optimal value, the steering characteristic and the turning performance can be kept excellent. As a method of the vehicle control, the joint force of the clutch of the center differential device 3 is adjusted to control the torque distribution of the front and rear wheels. The details of the method of the vehicle control is disclosed in JP-A-08-002274. If necessary, this publication may be referred to.

As described above, according to this embodiment, various kinds of values concerning the vehicle can be calculated on the basis of the action force acting on the wheel 5. First, the vehicle mass m is calculated on the basis of a well-known dynamic equation according to the physical law. When the vehicle makes an accelerated motion in the longitudinal (front-and-rear) direction, the load shift amount $\Delta Wx$ in the longitudinal direction of the vehicle is represented by the following equation by using the vertical force $\Delta Fz$ of each wheel 5 or by using the vehicle mass m, the longitudinal acceleration ax, the center-of-gravity height h and the wheel base L.

$$\Delta Wx = \frac{(\Delta Frl\_z + \Delta Frr\_z - \Delta Flz\_z - \Delta Ffr\_z)}{2} = \frac{m \cdot ax \cdot h}{L} \quad \text{[Equation 5]}$$

The product of the vehicle mass and the longitudinal acceleration ax can be replaced by the sum Fx_sum of the longitudinal forces Fx of the respective wheels 5, and thus an unknown quantity, that is, the center-of-gravity height can be uniquely calculated by the above equation 2.

Furthermore, the load shift amount in the lateral direction concerning the vehicle is represented by the following equation when the vehicle is making the turning motion.

$$\Delta Wf\_y = \frac{\Delta Ffr\_z - \Delta Ffl\_z}{2} = \frac{mf \cdot ay \cdot h}{df} \quad \text{[Equation 6]}$$

$$\Delta Wr\_y = \frac{\Delta Frr\_z - \Delta Frl\_z}{2} = \frac{mr \cdot ay \cdot h}{dr}$$

$\Delta Wf\_y$ represents the load shift amount in the lateral direction at the front wheel side, and $\Delta Wr\_y$ represents the load shift amount in the lateral direction at the rear wheel side. Here, mf represents a value achieved by dividing the product of the vehicle mass m and the rear wheel distance lr by the wheel base L, and mr represents a value calculated by dividing the product of the vehicle mass m and the front wheel distance lf by the wheel base L. By developing the above equations, the center-of-gravity h can be represented by the following equations in addition to the above two equations.

$$h = \frac{L \cdot (\Delta Ffr\_z - \Delta Ffl\_z)}{2 \cdot lr \cdot Fysum} \cdot df \quad (3) \quad \text{[Equation 7]}$$

$$h = \frac{L \cdot (\Delta Frr\_z - \Delta Frl\_z)}{2 \cdot lf \cdot Fysum} \cdot dr \quad (4)$$

According to the equation (3), when the rear wheel distance lr is known, the center-of-gravity height h can be calculated by dividing the difference between the vertical forces $\Delta Fz$ of the left and right front wheels 5fl and 5fr by the sum F_sum of the lateral forces Fy and then multiplying the division result by the proportionality constant ((L·df)/(2·lf)).

Furthermore, according to the equation (4), when the front wheel distance lf is known, the center-of-gravity height h can be calculated by dividing the difference between the vertical forces $\Delta Fz$ of the left and right rear wheels 5rl, 5rr by the sum Fy_sum of the lateral forces Fx and then multiplying the division result by the proportionality constant (L·dr)/(2·lf)).

According to the above equations, when the present value of the center-of-gravity height h is estimated by the above equation 2, the present value of the front wheel distance lf or the present value of the rear wheel distance lr can be uniquely estimated (see equation 3).

When the vehicle mass m and the front wheel distance lf or the rear wheel distance lr are estimated, the stationary load is applied to each wheel 5 can be estimated. By considering the load shift amount $\Delta Wx$ in the longitudinal direction and the load shift amount $\Delta Wf\_y$ (or $\Delta Wr\_y$) in the lateral direction for the stationary load, the absolute value Fz of the vertical force in each wheel 5 can be estimated (see the following equation 8).

$$Ffl\_z = \frac{m \cdot g \cdot lr}{2 \cdot L} - \frac{\Delta Wx}{2} - \Delta Wf\_y \quad \text{[Equation 8]}$$

$$Ffr\_z = \frac{m \cdot g \cdot lr}{2 \cdot L} - \frac{\Delta Wx}{2} + \Delta Wf\_y$$

$$Frl\_z = \frac{m \cdot g \cdot lf}{2 \cdot L} + \frac{\Delta Wx}{2} - \Delta Wr\_y$$

$$Frr\_z = \frac{m \cdot g \cdot lr}{2 \cdot L} - \frac{\Delta Wx}{2} + \Delta Wr\_y$$

The above equation 4 can be introduced by developing the load shift amount $\Delta Wx$ in the longitudinal direction of the equation 8 with the equation 5 and also developing the load shift amount $\Delta Wf\_y$ (or $\Delta Wr\_y$) in the lateral direction of the equation 8 with the equation 6.

According to this embodiment, even when the number of occupants is changed or a load is mounted, the values of the vehicle mass m, the center-of-gravity height h, the front wheel distance lf and the rear wheel distance lr can be detected on a real-time basis. Furthermore, according to this embodiment, since the action force is directly detected by the action force detector 22, the value thereof can be accurately specified. Therefore, the estimation precision can be enhanced by estimating various kinds of values on the basis of the action force. As a result, the reliability of the vehicle motion control can be enhanced by executing the control with the estimated values on which the present vehicle state reflects.

Furthermore, according to this embodiment, the absolute value Fz of the vertical force is estimated on the basis of the estimated values. Since the filtering process is carried out from the viewpoint that the temperature drift is suppressed, the detection value of the action force detector 22 becomes a relative value, that is, the variation amount of the action force based on the value when the vehicle is still. Therefore, it is hard to achieve the absolute value Fz of the vertical force. Therefore, according to this embodiment, the absolute value Fz of the vertical force can be estimated with the value detected by the action force detector 22 and the estimated value in consideration of the load shift amount based on the empty weight. Since the absolute value Fz of the vertical force can be estimated, the applicable control range can be enlarged. Furthermore, the reliability of the control can be enhanced by applying the absolute value Fz of the vertical force to the vehicle motion control. The values used to estimate the absolute value Fz of the vertical force reflect the present vehicle state, and thus the estimation precision of the absolute value Fz can be enhanced.

In this embodiment, the action force detector 22 is designed to detect the action force acting in the three directions. However, the present invention is not limited to this mode, and it is sufficient insofar as it can detect the action force acting in the directions of necessary component forces. It may be a gauge for six component forces containing not only the component forces of the three directions, but also moments around the three directions. Even this construction can detect at least the action force necessary for the estimation, and thus there occurs no problem. The method of detecting the six component forces acting on the wheels is disclosed in JP-A-2002-039744 and JP-A-2002-022579, and it may be referred to as occasion demands.

Furthermore, in this embodiment, the action force detector 22 is embedded in the axle 4. However, the present invention is not limited to this mode, and various other modes may be considered. From the viewpoint that the action force is detected, the action force detector 22 may be provided to a member for holding a wheel, such as a hub, a hub carrier or the like, for example. The method of providing the action force detector 22 to the hub is disclosed in JP-A-2003-104139, and it may be referred to as occasion demands.

What is claimed is:

1. An estimating device comprising:
    a first detector for detecting action forces acting on a wheel provided to a vehicle based on a detection of stress produced by the action forces on the wheel; and
    an estimator for estimating a present value of a vehicle mass on the basis of at least one of said action forces acting in a component force direction of the action forces, and an acceleration of the vehicle in the component force direction.

2. The estimating device according to claim 1, further comprising:
    a second detector for detecting one of an acceleration in a longitudinal direction of the vehicle and an acceleration in a lateral direction of the vehicle,
    wherein the first detector detects one of a longitudinal force and a lateral force as the action force corresponding to the detected acceleration direction, and
    the estimator estimates the present value of the vehicle mass on the basis of one of (i) the detected acceleration in the longitudinal direction and the detected longitudinal force and (ii) the detected acceleration in the lateral direction and the detected lateral force.

3. The estimating device according to claim 2, further comprising:
    a controller for controlling a motion state of a vehicle on the basis of an estimation result achieved by said estimator.

4. The estimating device according to claim 2,
    wherein the estimator estimates the present value of the vehicle mass on the basis of the detected acceleration in the longitudinal direction and the detected longitudinal force when the vehicle is being accelerated, and the estimator estimates the present value of the vehicle mass on the basis of the detected acceleration in the lateral direction and the detected lateral force when the vehicle is making a turn motion.

5. The estimating device according to claim 1,
    wherein the first detector detects a variation amount of a vertical force to a reference value and a longitudinal force as the action force, and the estimator estimates the present value of a center-of-gravity height of the vehicle on the basis of the detected variation amount of the vertical force and the detected longitudinal force.

6. The estimating device according to claim 5,
    wherein the first detector detects a lateral force as the action force, and the estimator estimates the present value of the distance between the center-of-gravity of the vehicle and an axle on the basis of the estimated present value of the center-of-gravity height, the detected variation amount of the vertical force and the detected lateral force.

7. The estimating device according to claim 6,
    wherein the estimator estimates an absolute value of the vertical force on the basis of the estimated present value of the vehicle mass, the estimated present value of the center-of-gravity height, the estimated present value of the distance between the center-of-gravity of the vehicle and the axle, the detected longitudinal force and the detected lateral force.

8. The estimating device according to claim 1, further comprising:
    a controller for controlling a motion state of a vehicle on the basis of an estimation result achieved by said estimator.

9. An estimating device comprising:
    a first detector for detecting a variation amount of a vertical force to a reference value and a longitudinal force as an action force acting on a wheel provided to a vehicle; and
    an estimator for estimating the present value of a center-of-gravity height of the vehicle on the basis of the detected variation amount of the vertical force and the detected longitudinal force.

10. The estimating device according to claim 9, further comprising:
    a controller for controlling a motion state of a vehicle on the basis of an estimation result achieved by said estimator.

11. The estimating device according to claim 9,
    wherein the first detector detects a plurality of action forces acting on the wheel including a lateral force acting on the wheel, and the estimator estimates the present value of the distance between the center-of-gravity of the vehicle and an axle on the basis of the estimated present value of the center-of-gravity height, the detected variation amount of the vertical force and the detected lateral force.

12. The estimating device according to claim 11, wherein the estimator estimates a present value of a vehicle mass on the basis of at least one of said action forces acting in a component force direction of said action forces, and wherein said estimator estimates an absolute value of the vertical force on the basis of the estimated present value of the vehicle mass, the estimated present value of the center-of-gravity height, the estimated present value of the distance between the center-of-gravity of the vehicle and the axle, the detected longitudinal force and the detected lateral force.

13. The estimating device according to claim 9, further comprising:

a second detector for detecting one of an acceleration in a longitudinal direction of the vehicle and an acceleration in a lateral direction of the vehicle, wherein the first detector detects one of the longitudinal force and a lateral force acting on the wheel corresponding to the detected acceleration direction, and the estimator estimates the present value of the vehicle mass on the basis of one of (i) the detected acceleration in the longitudinal direction and the detected longitudinal force and (ii) the detected acceleration in the lateral direction and the detected lateral force.

14. The estimating device according to claim 13, wherein the estimator estimates the present value of the vehicle mass on the basis of the detected acceleration in the longitudinal direction and the detected longitudinal force when the vehicle is being accelerated, and the estimator estimates the present value of the vehicle mass on the basis of the detected acceleration in the lateral direction and the detected lateral force when the vehicle is making a turn motion.

* * * * *